(12) United States Patent
Broussard et al.

(10) Patent No.: US 6,915,401 B2
(45) Date of Patent: Jul. 5, 2005

(54) SYSTEM AND METHOD FOR MANAGING OFF-SCREEN BUFFERS FOR ELECTRONIC IMAGES

(75) Inventors: Scott J. Broussard, Cedar Park, TX (US); Samuel L. Emrick, Austin, TX (US); Ravi Ravisankar, Austin, TX (US); Wai Yee Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/105,129

(22) Filed: Mar. 21, 2002

(65) Prior Publication Data

US 2003/0179207 A1 Sep. 25, 2003

(51) Int. Cl.⁷ .............................................. G06F 12/00
(52) U.S. Cl. ..................... 711/170; 345/548; 345/553
(58) Field of Search ........................... 711/170–173; 345/548, 547, 545, 553

(56) References Cited

U.S. PATENT DOCUMENTS

| | | | |
|---|---|---|---|
| 5,742,797 A | * 4/1998 | Celi et al. | 345/548 |
| 5,995,120 A | * 11/1999 | Dye | 345/543 |
| 6,018,774 A | 1/2000 | Mayle et al. | 709/250 |
| 6,067,068 A | 5/2000 | Hussain | 345/123 |
| 6,085,120 A | 7/2000 | Schwerdtfeger et al. | 700/90 |
| 6,167,442 A | 12/2000 | Sutherland et al. | 709/217 |
| 6,167,453 A | 12/2000 | Becker et al. | 709/245 |
| 6,229,537 B1 | 5/2001 | Sobeski et al. | 345/346 |
| 6,237,135 B1 | 5/2001 | Timbol | 717/1 |
| 6,272,674 B1 | 8/2001 | Holiday, Jr. | 717/1 |
| 6,281,874 B1 | 8/2001 | Sivan et al. | 345/127 |
| 6,286,051 B1 | 9/2001 | Becker et al. | 709/236 |
| 6,292,933 B1 | 9/2001 | Bahrs et al. | 717/1 |
| 6,396,473 B1 | * 5/2002 | Callahan et al. | 345/530 |
| 6,727,918 B1 | * 4/2004 | Nason | 715/791 |
| 2001/0004261 A1 | 6/2001 | Kambayashi et al. | 345/418 |
| 2003/0174136 A1 | * 9/2003 | Emberling et al. | 345/531 |

OTHER PUBLICATIONS

"Microsoft Gives Kids Tools and Technology to Unleash Their Imagination and Experience New Adventures," pp. 1–5, Oct. 9, 1996 http://www.microsoft.com/PressPass/press/1996/Oct96/KIDSPR.asp.*

Ken Getz, "Office 97 Shared Programmable Objects," 1997, MSDN Library, Apr. 1998 Version. Microsoft Corp., "Microsoft Visual Basic for Applications, Version 5.0 Solutions Enhancements Guide," Oct. 1996, MSDN Library, Apr. 1998 Version.*

* cited by examiner

*Primary Examiner*—Pierre-Michel Bataille
(74) *Attorney, Agent, or Firm*—Van Leeuwen & Van Leeuwen; Joseph T. Van Leeuwen; Mark S. Walker

(57) ABSTRACT

An off-screen buffer manager controls when the off-screen buffer is destroyed and re-created improving system performance. A screen request is received for a Java screen component and a determination is made whether there is already an off-screen buffer. If there is not an off-screen buffer, a new off-screen buffer is created and the component requesting the screen request is associated with the off-screen buffer. If an off-screen buffer already exists, a determination is made as to whether the off-screen buffer is large enough to handle the incoming request. If the off-screen buffer is large enough to handle the request, the existing off-screen buffer is used to handle the request, otherwise, the existing off-screen buffer is deleted and a new off-screen buffer is created and the component identifier of the deleted off-screen buffer is associated with the new off-screen buffer.

20 Claims, 6 Drawing Sheets

SYSTEM AND METHOD FOR MANAGING OFF-SCREEN BUFFERS FOR ELECTRONIC IMAGES

BACKGROUND OF THE INVENTION

1. Technical Field

The present invention relates in general to a system and method for managing off-screen buffers in a computer system. More particularly, the present invention relates to a system and method for managing Java Swing's off-screen buffer used for displaying graphics on a display device.

2. Description of the Related Art

Swing is a graphical user interface (GUI) toolkit that has been developed for the Java programming language. Essentially, Swing is a component framework built over parts of the older Abstract Windowing Toolkit (AWT) for visually displaying the Java output.

Swing components include a variety of graphical components such as labels, buttons, panels, sliders, lists, trees, and other graphical components. Because Swing is written in the Java programming language it is able to run on any computer platform (i.e., MS-Windows, UNIX, Apple MacIntosh, etc.) that includes a compatible Java virtual machine.

Swing is part of the Java Foundation Class (JFC). The JFC are a collection of packages that developers can use to create full featured applications in Java. The JFC includes Swing, AWT, Accessibility, Java 2D, and Drag and Drop functionality. Swing provides applications with increased portability across computer platforms as well as graphical "look and feel" that can be set within an application during runtime. These features allow an application running on an IBM AIX™ platform to use the same Swing code and have the same look and feel as an application running on a Microsoft Windows platform.

While Swing offers developers certain advantages over other graphical development tools, it currently also faces various challenges. One challenge is that Swing code may be slightly slower than native languages, such as the Microsoft Foundation Class (MFC), because Swing is written in Java. Another challenge is that the screen image is built in an off-screen buffer that is managed by Java's Repaint Manager. The off-screen buffer may be destroyed and recreated numerous times during an application's use. The repeated destruction and re-creation of the off-screen buffer negatively impacts system performance. This performance impact is especially noticeable in Java applications where multiple "heavyweight" Java components are being used. Heavyweight components include all of the ready-to-use AWT components (such as Frame, Dialog, and ScrollPane) and all components that inherit from the AWT Canvas and Panel classes.

The off-screen buffer is similar to a bitmap where the various graphical components are written. When all the graphical components are written to the off-screen buffer, it is painted onto the display device by the Repaint Manager. When a heavyweight component is invoked (e.g., by the user selecting a heavyweight component, such as a Dialog), the existing off-screen buffer is destroyed and is recreated by the Repaint Manager. Conversely, when lightweight (i.e., Swing based components) are used, the off-screen buffer is not destroyed and the lightweight component is written to the existing off-screen buffer along with the heavyweight component and any other light weight components.

Sharing of the off-screen buffer continues until either more space is needed in the off-screen buffer (i.e., the components take up more screen space), or when a different heavyweight component is selected. When either of these conditions occur, the current off-screen buffer is destroyed and a new one is created by the Repaint Manager. As mentioned before, this repeated destruction and creation of the off-screen buffer is particularly challenging in applications where two or more heavyweight components are repeatedly invoked, thereby causing the buffer to repeatedly be destroyed and re-created causing system performance to degrade.

What is needed, therefore, is a system and method in which the Java Swing's off-screen buffer is shared among multiple heavyweight components.

SUMMARY

It has been discovered that the aforementioned challenges are overcome by using an off-screen buffer manager that controls when the off-screen buffer is destroyed and re-created. It has been discovered that associating the off-screen buffer with the oldest window component, rather than the most recently created component, results in fewer destructions and re-creations of the off-screen buffer as the oldest window component tends to be an application's main window. Minimizing such destructions and re-creations in this manner, therefore, improves system performance.

When a screen request (i.e., create, resize, paint) is received for a screen component, the off-screen buffer manager determines whether there is already an off-screen buffer that has been created regardless of whether the screen request is from a heavyweight or lightweight component. If there is not an off-screen buffer (i.e., it had previously been destroyed or the screen request is the first such request for the application), a new off-screen buffer is created and the component requesting the screen request is associated with the off-screen buffer.

On the other hand, if an off-screen buffer already exists a determination is made as to whether the off-screen buffer is big enough to handle the incoming request (i.e., if the request is to make one of the screen components larger). If the off-screen buffer is large enough to handle the request, the existing off-screen buffer is used to handle the request (i.e., a new window is painted into the off-screen buffer) regardless of whether the request is from a heavyweight or lightweight component. If the off-screen buffer is not large enough to handle the request, the current off-screen buffer is destroyed and a new, larger, buffer is created that is large enough to contain the various screen components.

Conversely, when a screen component is destroyed (i.e., when a user closes an open dialog box), a determination is made as to whether the screen component being destroyed is associated with the off-screen buffer. So long as the screen component being destroyed is not associated with the off-screen buffer, the buffer is not destroyed. However, when the screen component that is associated with the off-screen buffer is destroyed, then the off-screen buffer is also destroyed. If other window components for the application are still active, then another off-screen buffer is eventually created with one of the active window components being associated with the off-screen buffer. In this manner, the off-screen buffer is used more efficiently with fewer deletions and re-creations of the buffer, thus improving overall system efficiency.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
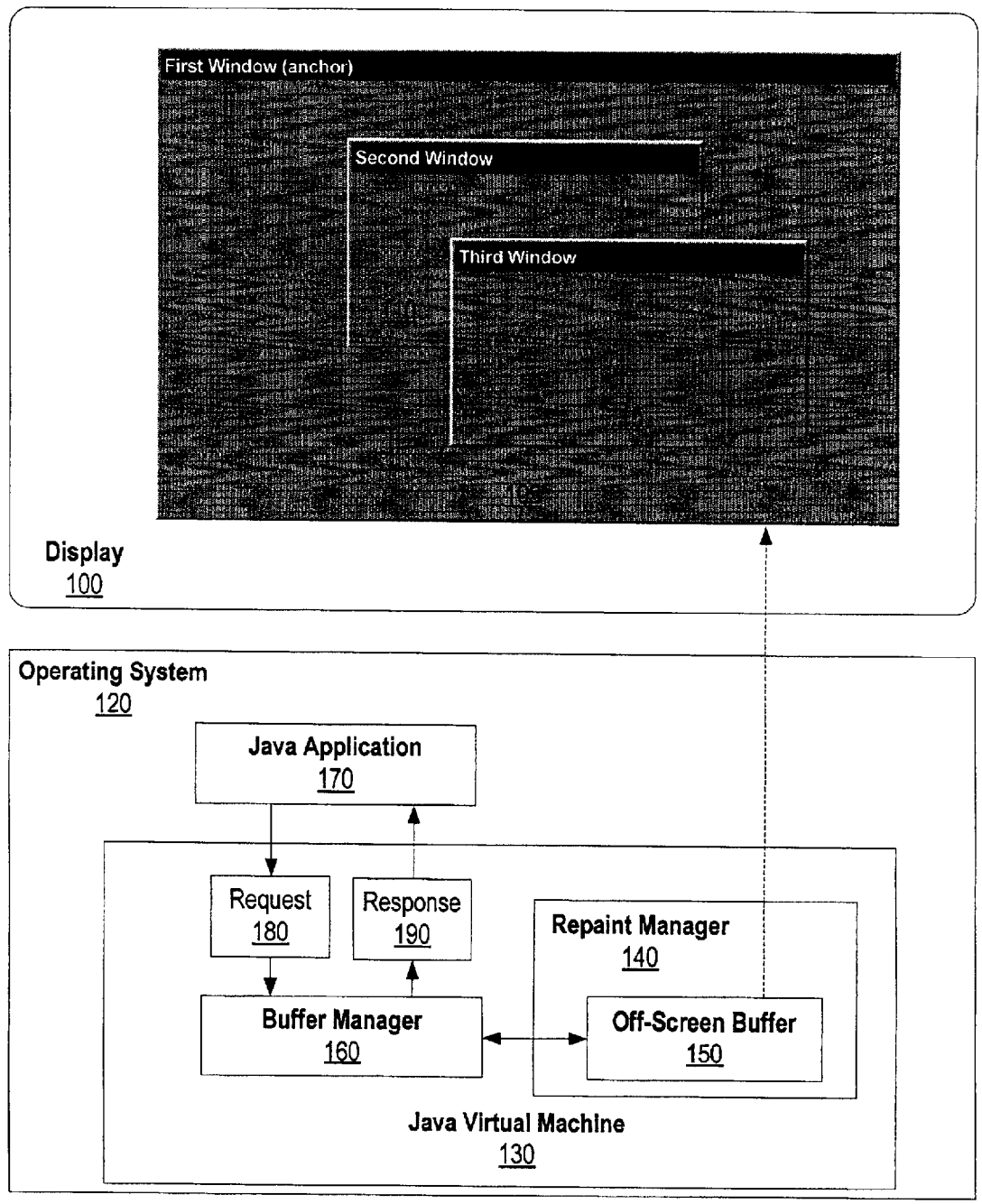
FIG. 1 is a high level diagram showing the off-screen buffer manager controlling the off-screen buffer and the resulting display image.

FIG. 1 is a high level diagram showing the off-screen buffer manager controlling the off-screen buffer and the resulting display image. Display 100 includes Java window 105. Java window 105 is shown as the first window, or anchor, that is associated with the off-screen buffer. Java window 105 is shown with two other windows—window 110 and window 115. Windows may be created by either Java lightweight components or by Java heavyweight components. Lightweight components include Swing components such as button, toolbar and list controls. Heavyweight components include frames, windows, dialog, and applet controls as well as other AWT (Abstract Windowing Toolkit) controls.

Operating system 120 can be one of many operating systems for which a Java virtual machine exists. Examples of such operating systems include IBM AIX™, Microsoft Windows™, UNIX™, and Apple MacIntosh™ operating systems. Java Virtual Machine (JVM) 130 supports Java applications on various operating platforms. In this manner, a Java application can be written and executed on any of the operating systems mentioned above.

Within the JVM is Repaint Manager 140 which writes off-screen buffer 150 to display 100 when necessary. Buffer manager 160 is used to manage the off-screen buffer. This management includes determining when the off-screen buffer should be destroyed and recreated.

Buffer manager 160 processes requests 180 from one or more applications 170. These requests include requests to create, resize, and paint a graphical component to the off-screen buffer as well as requests to delete a graphical component from the off-screen buffer. The JVM returns response 190, such as a return code or off-screen buffer pointer, to the requesting applications.

Buffer manager 160 checks to determine whether off-screen buffer 150 exists and whether the off-screen buffer is large enough to handle an request to create, resize, or paint one of the graphic components (i.e., windows 105, 110, or 115). If the off-screen buffer exists and is large enough to handle request 180, then the existing off-screen buffer is used to store the graphical image corresponding to request 180, regardless of whether the request corresponds to a lightweight or heavyweight Java component. If off-screen buffer 150 does not exist (i.e., the request is for the first window in the application or the off-screen buffer was destroyed), then the first component (i.e., window 105) is associated to the off-screen buffer. Subsequent window creation requests (i.e., creation of windows 110 and 115) then use the existing off-screen buffer associated to window 105 so long as the existing off-screen buffer is large enough to handle the request.

Likewise, when a windows deletion (destroy) request is received, buffer manager 160 checks to determine whether the window being destroyed is the window that is currently associated with off-screen buffer 150. If the window associated with the off-screen buffer is destroyed then, in one embodiment, the off-screen buffer is also destroyed. The off-screen buffer is subsequently re-created and associated with an existing window. However, if the window being destroyed is not associated with the off-screen buffer, then the window is deleted from the off-screen buffer but the off-screen buffer is not destroyed.

In the example shown in FIG. 1, if a deletion request is received for first window 105, then off-screen buffer 150 is also deleted because first window 105 is associated with the off-screen buffer. On the other hand, if a deletion request is received for either second window 110 or third window 115, then the image associated with the deleted window is removed from off-screen buffer 150, but the off-screen buffer itself is not destroyed.

Figure 2:
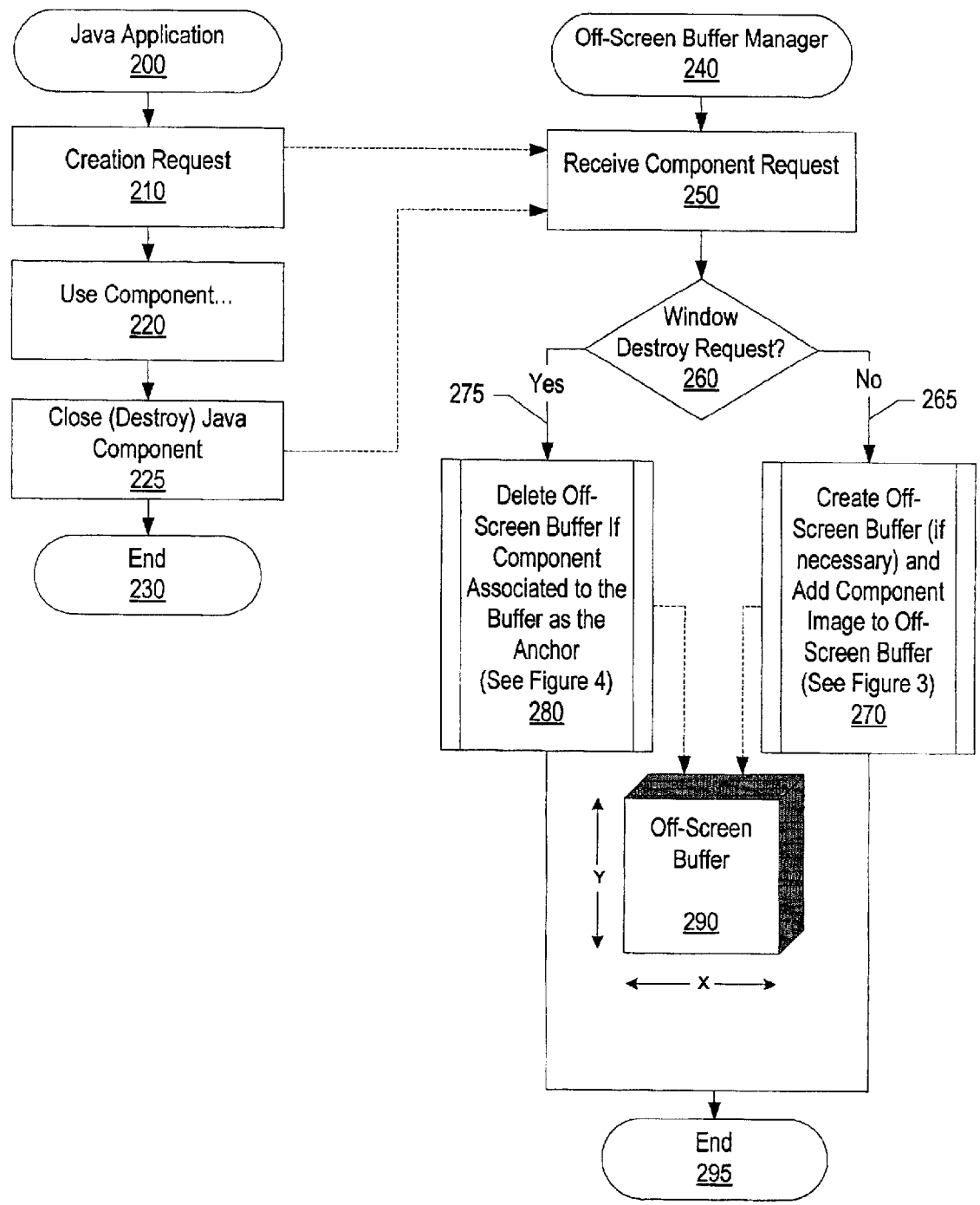
FIG. 2 is a high level flowchart showing the steps taken by the off-screen buffer manager in processing an application request.

FIG. 2 is a high level flowchart showing the steps taken by the off-screen buffer manager in processing an application request. Java application processing commences at 200 sends Java component request 210 to Off-Screen Buffer manager 240. Off-Screen Buffer manager processing commences at 240 whereupon the buffer manager receives a request from a Java application (step 250). The Off-Screen Buffer manager determines whether the received request is to delete a Java screen component or to create (i.e., create, resize, paint, etc.) a component (decision 260). If the request is to create a component, decision 260 branches to "no" branch 265 whereupon the off-screen buffer is created, if necessary (i.e., if it does not currently exist or is too small to handle the request) and the screen component is stored in Off-Screen Buffer 290 (predefined process 270, see FIG. 3 for further details). Off-Screen Buffer manager processing thereafter ends at 295.

On the other hand, if the request is to delete (i.e., destroy) a screen component, decision 260 branches to "yes" branch 275 whereupon the screen component is removed from the off-screen buffer and off-screen buffer 290 is deleted (predefined process 280, see FIG. 4 for processing details) if necessary (i.e., if the component being deleted is associated to the off-screen buffer as the anchor). Off-Screen Buffer manager processing thereafter ends at 295.

Returning to application processing, the application uses the created screen component (step 220). When the application is finished with the screen component, such as when the user closes a dialog panel, a close (i.e., destroy) request is sent from the application to the Off-Screen Buffer manager (step 225) whereupon the screen component is removed from off-screen buffer 290 by the Off-Screen Buffer Manager as described above. Application processing thereafter ends at 230.

Figure 3:
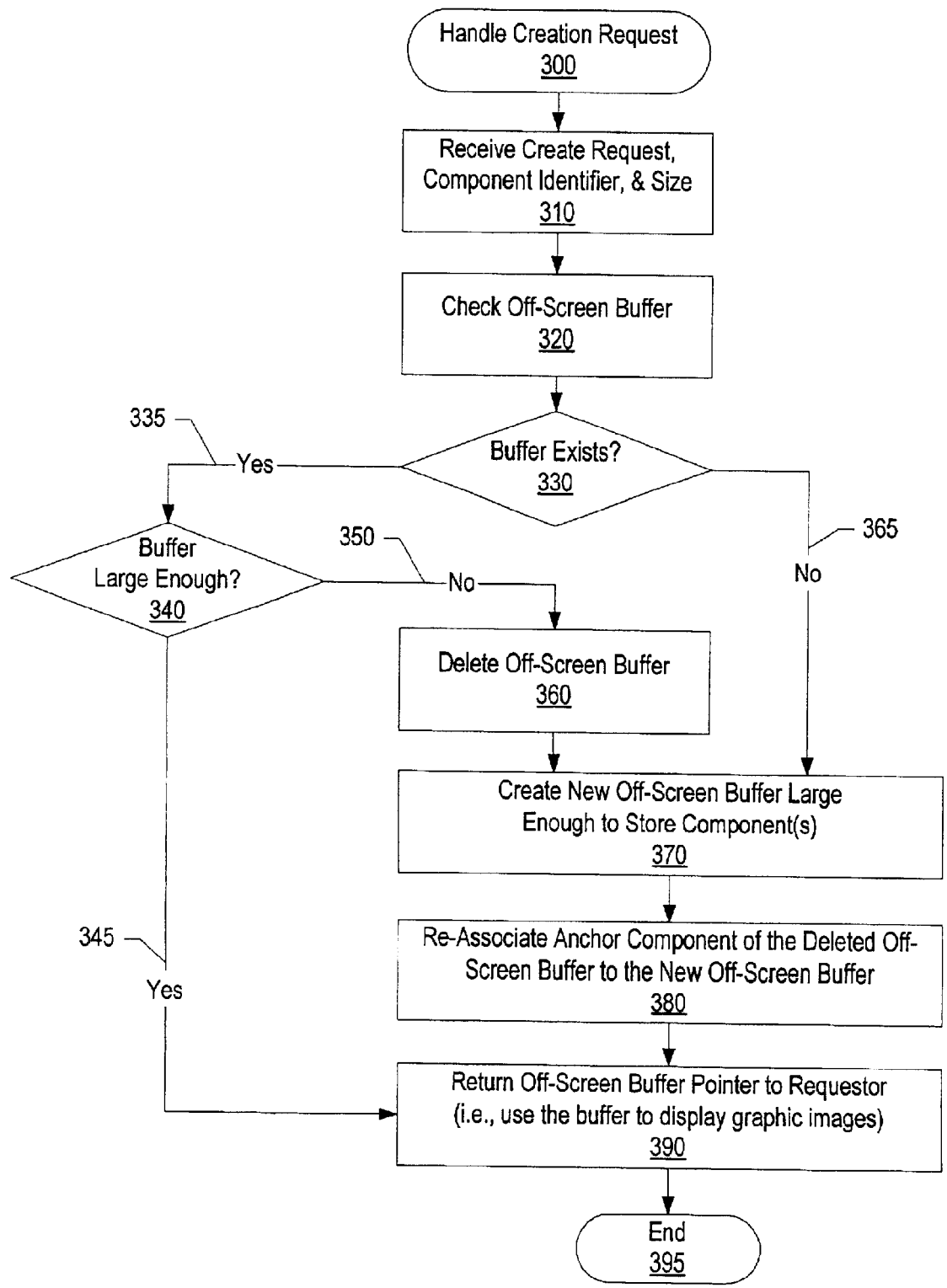
FIG. 3 is a flowchart showing the steps taken by the off-screen buffer manager in processing a creation request.

FIG. 3 is a flowchart showing the steps taken by the off-screen buffer manager in processing a creation request. Processing commences at 300 whereupon a creation request is received (step 310). Creation requests include create, resize, and repaint requests and may correspond to either Java lightweight or heavyweight components. Creation requests also include a size corresponding to the image being requested.

The buffer manager checks the off-screen buffer to determine what action should be taken (step 320). A determination is made as to whether the off-screen buffer exists (decision 330). If the off-screen buffer exists, decision 330 branches to "yes" branch 335 whereupon a determination is made as to whether the current off-screen buffer is large enough to include the image corresponding to the create request (decision 340). If the off-screen buffer is large enough to include the image, decision 340 branches to "yes" branch 345 whereupon a pointer to the off-screen buffer is returned and the image is included in the current off-screen buffer (step 390). Processing thereafter ends at 395.

On the other hand, if the current off-screen buffer is not large enough to include the image corresponding to the create request, decision 340 branches to "no" branch 350 whereupon the current off-screen buffer is deleted (step 360). A new off-screen buffer is created which is large enough to include the various component(s) (step 370). The anchor component of the deleted off-screen buffer (i.e., the original anchor component) is re-associated to the new off-screen buffer (step 380). A pointer to the off-screen buffer is returned and the image is included in the new off-screen buffer (step 390). Processing thereafter ends at 395.

On the other hand, if the current off-screen buffer is not large enough to include the image corresponding to the create request, decision 340 branches to "no" branch 350 whereupon the current off-screen buffer is deleted (step 360). A new off-screen buffer is created which is large enough to include the various component(s) (step 370). The requesting component is associated to the new off-screen buffer (step 380). A pointer to the off-screen buffer is returned and the image is included in the new off-screen buffer (step 390). Processing thereafter ends at 395.

Returning to decision 330, if a current off-screen buffer does not exist, decision 330 branches to "no" branch 365 whereupon a new off-screen buffer is created which is large enough to include the various component(s) (step 370). The requesting component is associated to the new off-screen buffer (step 380). A pointer to the off-screen buffer is returned and the image is included in the new off-screen buffer (step 390). Processing thereafter ends at 395.

Figure 4:
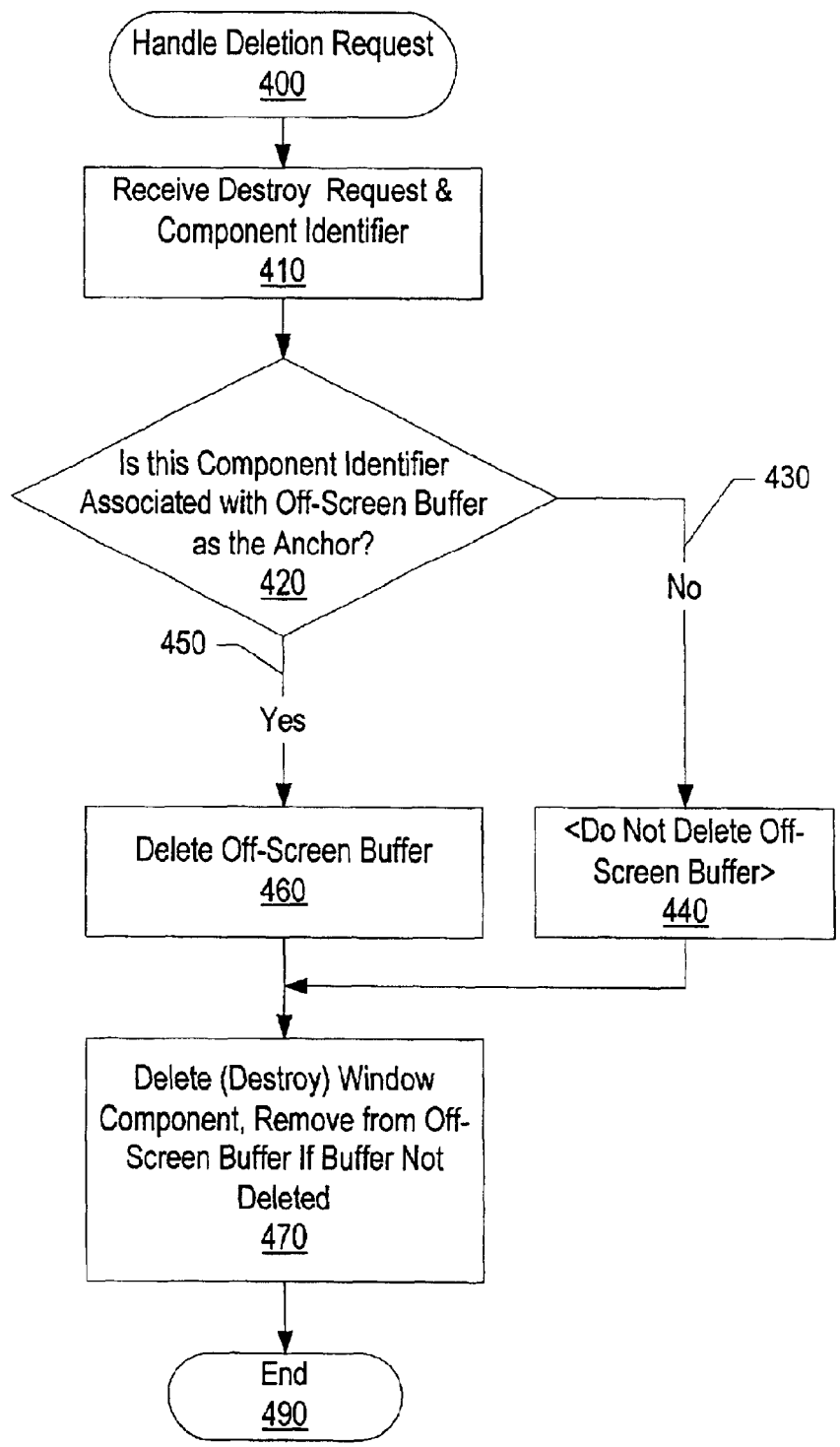
FIG. 4 is a flowchart showing the steps taken by the off-screen buffer manager in processing a window deletion request.

FIG. 4 is a flowchart showing the steps taken by the off-screen buffer manager in processing a window deletion request. Processing commences at 400 whereupon a window destroy request is received from a Java application (step 410). A determination is made as to whether the request corresponds to the window that is currently associated with the off-screen buffer (decision 420). If the request does not correspond to the window that is currently associated with the off-screen buffer, decision 420 branches to "no" branch 430 whereupon the off-screen buffer is not deleted (step 440), the window corresponding to the request is destroyed (step 470, i.e., removed from the current off-screen buffer), and processing ends at 490.

On the other hand, if the request corresponds to the window that is currently associated with the off-screen buffer, decision 420 branches to "yes" branch 450 whereupon the off-screen buffer is deleted (step 460) and data pertaining to the window is destroyed (step 470). In this embodiment, if there are more components using the off-screen buffer, a new buffer will eventually be created (see FIG. 3) and associated with one of the existing window components. In another embodiment, when the anchor component is destroyed the existing off-screen buffer is re-associated with another existing window component without destroying the off-screen buffer. Processing thereafter ends at 490.

Figure 5:
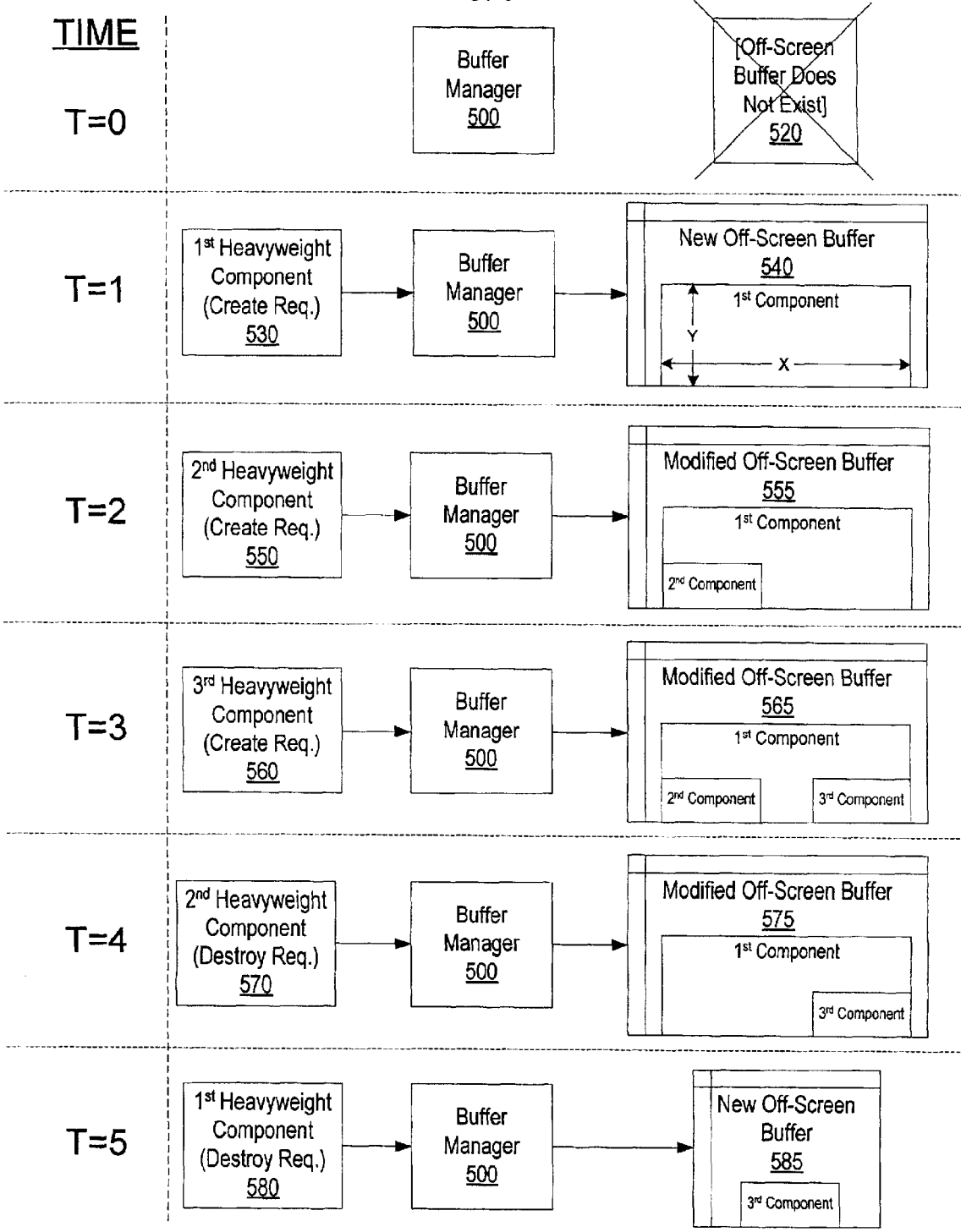
FIG. 5 is a sequence diagram showing an example of the off-screen buffer manager handling various component requests.

FIG. 5 is a sequence diagram showing an example of the off-screen buffer manager handling various component requests. Initially (at time=0), off-screen buffer manager 500 has no off-screen buffer to manage (non-existent buffer 520).

At time=1, an initial create request is received from a first Java heavyweight component (530). Off-screen buffer manager 500 creates a new off-screen buffer (540) and allocates enough memory in order to store the first heavyweight component. The off-screen buffer manager also associates the first Java component with the new off-screen buffer as the anchor. In this manner, the off-screen buffer will remain intact so long as the associated component is in existence and the buffer is large enough handle various creation-type requests (i.e., resize, create, paint, etc.).

At time=2, a second create request is received from a second Java heavyweight component, such as a dialog box (550). Off-screen buffer manager 500 determines that an off-screen buffer already exists and that the off-screen buffer is large enough to store the second Java heavyweight component. Off-screen buffer manager therefore does not destroy the off-screen buffer. The resulting, modified off-screen buffer (555) will now include both the first and second components. In one embodiment, the modifying of the off-screen buffer is handled by the Java Repaint Manager.

At time=3, a third create request is received from a third Java heavyweight component (560). Off-screen buffer manager 500 again determines that an off-screen buffer already exists and that the off-screen buffer is large enough to store the third Java heavyweight component. Off-screen buffer manager therefore does not destroy the off-screen buffer. The resulting, modified off-screen buffer (565) now includes the first, second, and third components.

At time=4, a request is received to delete the second heavyweight Java component (570). Off-screen buffer manager 500 determines that the component being destroyed is not associated with the off-screen buffer and, therefore, does not destroy the off-screen buffer. The second component is removed from the off-screen buffer by the Java Repaint Manager. Modified off-screen buffer 575 now includes the first and third components.

At time=5, a request is received to delete the first heavyweight Java component (580). Off-screen buffer manager 500 determines that the component being destroyed is associated with the off-screen buffer and, therefore, destroys the off-screen buffer. Because one of the components (the third component) still exists, new off-screen buffer 585 is created by allocating enough memory to store the third component. Off-screen buffer manager 500 now associates the third component to new off-screen buffer 585 and will destroy the off-screen buffer when either the third component is destroyed or when the new off-screen buffer is not large enough to handle a creation request (i.e., if a new window is created that needs more memory than allocated for new off-screen buffer 585).

Figure 6:
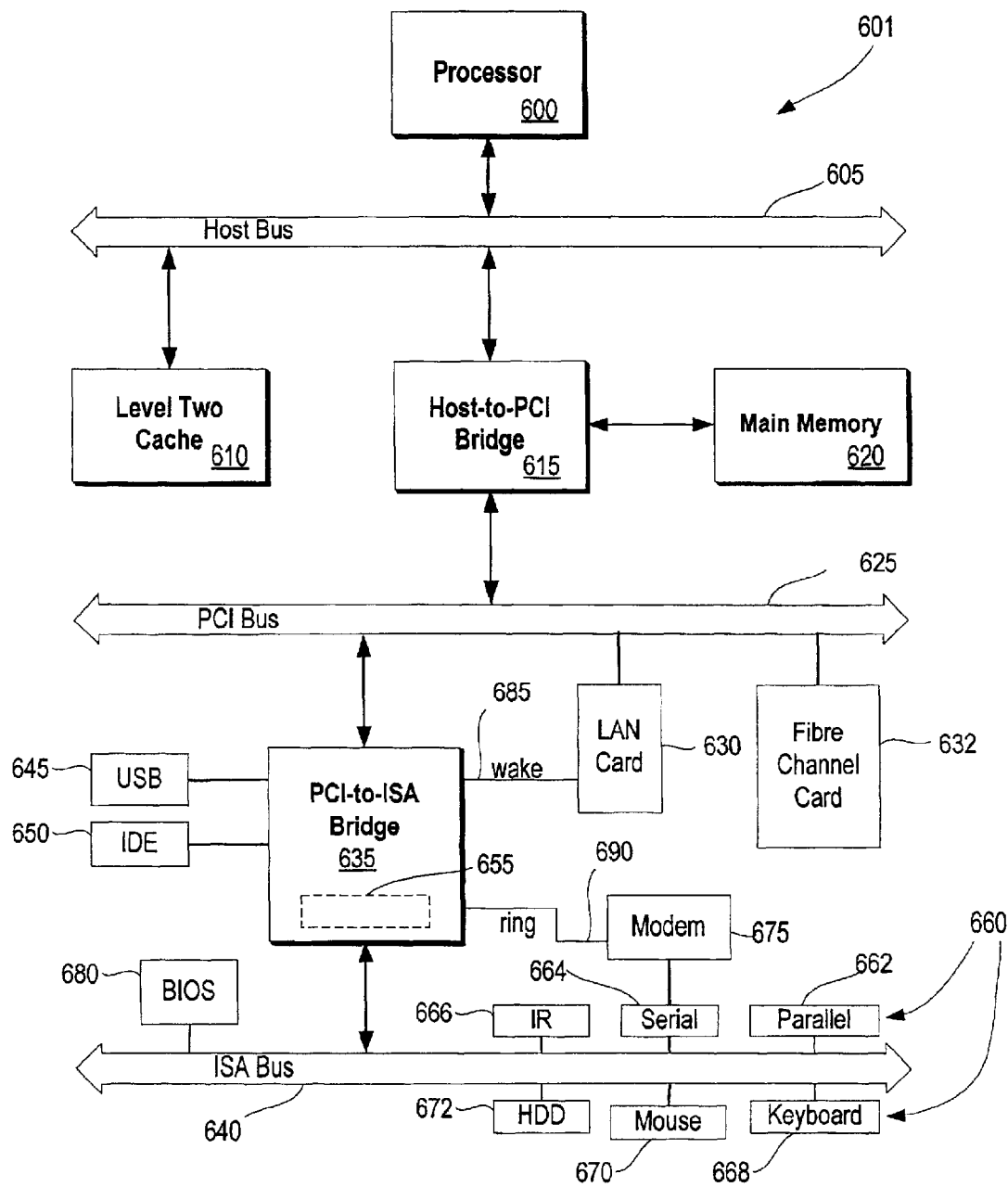
FIG. 6 is a block diagram of an information handling system capable of implementing the present invention.

FIG. 6 illustrates information handling system 601 which is a simplified example of a computer system capable of performing the computing operations described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for managing a Java off-screen buffer on a computer system, said method comprising:
   receiving a Java display request from an application, the request including a component identifier;
   comparing the request to a current off-screen buffer environment;
   creating a new off-screen buffer environment in response to the comparison; and
   associating the component identifier with the new off-screen buffer.

2. The method as described in claim 1 wherein the comparing further comprises:
   determining whether a current off-screen buffer exists in the current off-screen buffer environment; and
   determining whether the current off-screen buffer is large enough to store a graphic image corresponding to the request.

3. The method as described in claim 1 further comprising:
   receiving a component destroy request following the associating, the component destroy request including a second identifier corresponding with a component image currently included in the new off-screen buffer;
   comparing the second identifier with the identifier associated with the new off-screen buffer;
   deleting the new off-screen buffer in response to the second identifier being the same as the identifier associated with the new off-screen buffer.

4. The method as described in claim 3 further comprising:
   removing the component image from the new off-screen buffer in response to the second identifier not being the same as the identifier associated with the new off-screen buffer.

5. The method as described in claim 1 wherein the Java display request is selected from the group consisting of a create request, a resize request, and paint request.

6. The method as described in claim 1 further comprising:
   receiving a second Java display request following the associating;
   comparing the request to the new off-screen buffer environment corresponding to the new off-screen buffer;
   determining that the new off-screen buffer exists and that the new off-screen buffer is large enough to store an image corresponding to the second Java display request; and
   including the image in the new off-screen buffer.

7. The method as described in claim 6 wherein the second Java display request includes a Java heavyweight component request.

8. An information handling system comprising:
   one or more processors;
   a memory accessible by the processors;
   a nonvolatile storage device managed by a file system, the nonvolatile storage device including one or more directories that include one or more files;

an buffer management tool for managing a Java off-screen buffer, the buffer management tool including:
    means for receiving a Java display request from an application, the request including a component identifier;
    means for comparing the request to a current off-screen buffer environment;
    means for creating a new off-screen buffer environment in response to the comparison; and
    means for associating the component identifier with the new off-screen buffer.

9. The information handling system as described in claim 8 wherein the means for comparing further comprises:
    means for determining whether a current off-screen buffer exists in the current off-screen buffer environment; and
    means for determining, whether the current off-screen buffer is large enough to store a graphic image corresponding to the request.

10. The information handling system as described in claim 8 further comprising:
    means for receiving a component destroy request following the associating, the component destroy request including a second identifier corresponding with a component image currently included in the new off-screen buffer;
    means for comparing the second identifier with the identifier associated with the new off-screen buffer;
    means for deleting the new off-screen buffer in response to the second identifier being the same as the identifier associated with the new off-screen buffer.

11. The information handling system as described in claim 10 further comprising:
    means for removing the component image from the new off-screen buffer in response to the second identifier not being the same as the identifier associated with the new off-screen buffer.

12. The information handling system as described in claim 8 wherein the Java display request is selected from the group consisting of a create request, a resize request, arid paint request.

13. The information handling system as described in claim 8 further comprising:
    means for receiving a second Java display request following the means for associating;
    means for comparing the request to the new off-screen buffer environment corresponding to the new off-screen buffer;
    means for determining that the new off-screen buffer exists and that the new off-screen buffer is large enough to store a graphical image corresponding to the second Java display request; and
    means for including the graphical image in the new off-screen buffer.

14. A computer program product stored in a computer operable media for managing a Java off-screen buffer, said computer program product comprising:
    means for receiving a Java display request from an application, the request including a component identifier;
    means for comparing the request to a current off-screen buffer environment;
    means for creating a new off-screen buffer environment in response to the comparison; and
    means for associating the component identifier with the new off-screen buffer.

15. The computer program product as described in claim 14 wherein the means for comparing further comprises:
    means for determining whether a current off-screen buffer exists in the current off-screen buffer environment; and
    means for determining whether the current off-screen buffer is large enough to store a graphic image corresponding to the request.

16. The computer program product as described in claim 14 further comprising:
    means for receiving a component destroy request following the associating, the component destroy request including a second identifier corresponding with a component image currently included in the new off-screen buffer;
    means for comparing the second identifier with the identifier associated with the new off-screen buffer;
    means for deleting the new off-screen buffer in response to the second identifier being the same as the identifier associated with the new off-screen buffer.

17. The computer program product as described in claim 16 further comprising:
    means for removing the component image from the new off-screen buffer in response to the second identifier not being the same as the identifier associated with the new off-screen buffer.

18. The computer program product as described in claim 14 wherein the Java display request is selected from the group consisting of a create request, a resize request, and paint request.

19. The computer program product as described in claim 14 further comprising:
    means for receiving a second Java display request following the means for associating;
    means for comparing the request to the new off-screen buffer environment corresponding to the new off-screen buffer;
    means for determining that the new off-screen buffer exists and that the new off-screen buffer is large enough to store a graphical image corresponding to the second Java display request; and
    means for including the graphical image in the new off-screen buffer.

20. The computer program product as described in claim 19 wherein the second Java display request includes a Java heavyweight component request.

* * * * *